United States Patent [19]

Kurth et al.

[11] Patent Number: 4,613,978
[45] Date of Patent: Sep. 23, 1986

[54] NARROWBAND INTERFERENCE SUPPRESSION SYSTEM

[75] Inventors: Richard R. Kurth, Sudbury; Robert A. Gabel, Acton, both of Mass.

[73] Assignee: Sperry Corporation, New York, N.Y.

[21] Appl. No.: 620,766

[22] Filed: Jun. 14, 1984

[51] Int. Cl.⁴ .............................................. H03K 11/00
[52] U.S. Cl. ...................................... 375/99; 455/308
[58] Field of Search ................... 375/99, 103, 104, 76, 375/1; 364/726, 725; 343/5 FT; 455/146, 308

[56] References Cited

U.S. PATENT DOCUMENTS

| | | | |
|---|---|---|---|
| 2,954,465 | 9/1960 | White | 455/146 |
| 3,064,196 | 11/1962 | Broadhead, Jr. | 455/308 |
| 4,010,360 | 3/1977 | Alsup et al. | 364/726 |
| 4,351,062 | 9/1982 | Yoshiya | 375/99 |

Primary Examiner—Benedict V. Safourek
Assistant Examiner—M. Huseman
Attorney, Agent, or Firm—Howard P. Terry

[57] ABSTRACT

Strong narrowband signals interfering with the reception of a desired broadband signal in systems such as spread spectrum systems are continuously suppressed by converting the received signal to a frequency-domain representation thereof wherein strong narrowband interference components appear as strong impulse components. These impulsive components are blanked or clipped at a level that is a function of the average magnitude of the input signal. Resulting suppressed frequency-domain signals are reconverted to time-domain signals that are then available for further processing by conventional broadband signal receivers.

18 Claims, 7 Drawing Figures

NARROWBAND INTERFERENCE SUPPRESSION SYSTEM

BACKGROUND OF THE INVENTION

1. Field of the Invention

The present invention relates to broadband radio frequency receiver systems and more specifically to narrowband interference suppression circuits for use with such receivers.

2. Description of the Prior Art

Broadband signalling, in which radio frequency energy to be transmitted is spread over a wide band of frequencies, is frequently employed in radar, sonar, navigation, communications, control, and identification systems to reduce: detectability of such transmissions by receivers other than those intended to receive the transmissions; intended receiver susceptibility to interference; or interference by such signals to other receivers. Such spread spectrum transmissions ordinarily operate at an advantage in the presence of narrowband noise. However sufficiently strong narrowband interference will comprise reception of the spread spectrum signals and may render the intended receivers inoperable. In order to overcome this potential problem, suppression means auxiliary to the basic receiver demodulation may be employed to suppress the narrowband interference when this inteference exceeds the level at which the receiver demodulator performance is seriously affected.

A number of approaches to this type of narrowband suppression have been suggested.

In one approach, a narrowband tracking loop, such as a phase-locked loop, is used to acquire a narrowband component within the broad input frequency band and subtract this component from the overall input signal. This system suffers from the fact that the broadband signal acts as a noise signal which disturbs the operation of the tracking loop. Furthermore, when more than one narrowband interference component is present, the loop subtraction maay operate unsatisfactorily. A multiple-loop cancellation system might be employed in such situations, but would be highly complex if not impractical. In addition this approach would be ineffective where sufficiently rapid phase or frequency modulation in the interfering signal is encountered.

Another closed-loop cancellation approach utilizes a filter which estimates the narrowband interference component in the received signal and subtracts this estimate from the input. The filter parameters are modified in an adaptive manner to minimize correlation of the narrowband components in the supression system output with corresponding components in the input. This approach requires complex circuitry to implement the filtering and adaptation functions.

Still another approach utilizes open-loop techniques wherein the input signal is measured and processed to reduce the interference component detected by the measurement. Such methods usually require a spectral analysis of the input signal which reveals the interference as peaks in the broadband measured spectrum. The peaks are attenuated or removed from the overall spectrum and an inverse spectral analysis operation is performed to transform the spectrum back into a time-domain waveform. This approach, which is referred to as a "frequency-domain excision" of narrowband interference, is described by R. M. Hayes and C. S. Hartmann in an article entitled "SAW Devices for Communications", appearing in the Proceedings of the IEEE for May, 1976, pp. 664–669 and L. B. Milstein and P. K. Das in an article entitled "Spread Spectrum Receiver Using Surface Acoustic Wave Technology", appearing in the IEEE Transactions on Communications for August 1977, pp. 841–847.

Frequency-domain excision systems employ various means for obtaining signals which represent the spectrum of the input waveform. In systems employing sampled-data, or discrete time, spectral analysis, the input signal is repetitively sampled and subjected to analysis by means of a Discrete Fourier Transform (DFT). If certain Fourier coefficients are large due to narrowband signal components of the input, they may be reduced or eliminated after which the remaining information is reconverted to a time-domain format. In a variation of this method, a series of N input signal samples is multiplied by a discrete waveform which has a quadratically varying phase-versus-time equivalent to a linear frequency modulation or "chirp". The product signal is then passed through a linear sampled-data filter having an impulse response with $2N-1$ samples and a complex exponential form with a quadratic phase identical to the pre-filter multiplication signal except for its sign. An appropriately selected N-sample segment of the output of the filter is then multiplied by a delayed version of the previously mentioned discrete waveform to obtain a discrete signal comprising a sequence of the Fourier coefficients.

Such chirp transform spectral analysis employing analog processing means has been described, for instance, by R. M. Hayes et al in "Surface-Wave Transform Adaptable Processor System", in the 1975 Proceedings of the Institute of Electrical and Electronic Engineers Ultrasonics Symposium, pp. 363–370; by O. W. Otto in "The Chirp Transform Signal Processor" in the 1976 Proceedings of the Institute of Electrical and Electronic Engineers Ultrasonic Symposium, pp. 365–370; and in U.S. Pat. No. 4,049,958.

There are several difficulties with the chirp transform as used in the aforementioned systems. The filtering operation within the transform, for instance, is limited to a duty factor of less than 100%. Continuous or 100% duty factor transforms and their inverses are necessary to provide the fully reconstructed time-domain receiver input with suppressed interference. This duty factor problem may be overcome by using several switchable filters in a conventional chirp transform system, but this would entail considerable complexity in the required multiple closely matched filters and switching circuits. Alternatively, a single filter might be used with a 100% duty factor, but internal interference components which are thereby generated in the Fourier transformation and its inverse may themselves seriously interfere with proper receiver operation.

Systems applying 100% duty factor modified chirp transforms are described by T. F. Quatieri, Jr. in "Short-Time Spectral Analysis with the Conventional and Sliding CZT", Institute of Electrical and Electronic Engineers Transactions on Acoustics, Speech, and Signal Processing, Vol. ASSP-26, No. 6, December 1978. These systems perform signal reconstruction by interpolation and summation techniques. Fully reconstructed time domain signals with suppressed interference are not realized;

A more serious difficulty with frequency-domain excision employing conventional chirp transform techniques is the problem of coherent reconstruction of the time-domain waveform after excision. In both the discrete and analog chirp transforms, a segment of the input signal is gated to produce a finite duration signal representing the Fourier transform of the input segment. The inverse chirp transform operates in a similar fashion so as to produce a segment of the interference-suppressed output waveform. Thus when the receiver input is present continually, it must be segmented and processed through chirp transform excision circuits in blocks, and the sequential output segments thereby produced must be combined with the proper phase relationships and without significant transients. For continuous or "real time" excision using analog chirp transforms, this problem is difficult to solve in practice. Furthermore, the problem is compounded by the necessity for complex switched filter configurations needed to produce 100% duty factor operation. U.S. Pat. No. 4,287,475 discloses a system employing a conventional sampled-data chirp transform that accomplishes the desired reconstruction after excision. This system, however, due to the use of the conventional chirp transform, requires multiple switched chirp filters to realize the necessary 100% duty factor operation.

The present invention provides means for adaptively suppressing strong narrowband signals that might interfere with the reception of desired broadband signals on a continuous basis without apriori knowledge of the detailed characteristics of the narrowband interference.

SUMMARY OF THE INVENTION

The effects of narrowband interfering signals occurring in a desired wideband received signal are minimized by converting the signal as received into a frequency-domain representation of that signal in which the narrowband interference components appear as strong impulsive signals, continuously suppressing these components as a function of the input signal, and reconverting the resulting signal into a continuous time-domain format.

DESCRIPTION OF THE PREFERRED EMBODIMENTS

Figure 1:
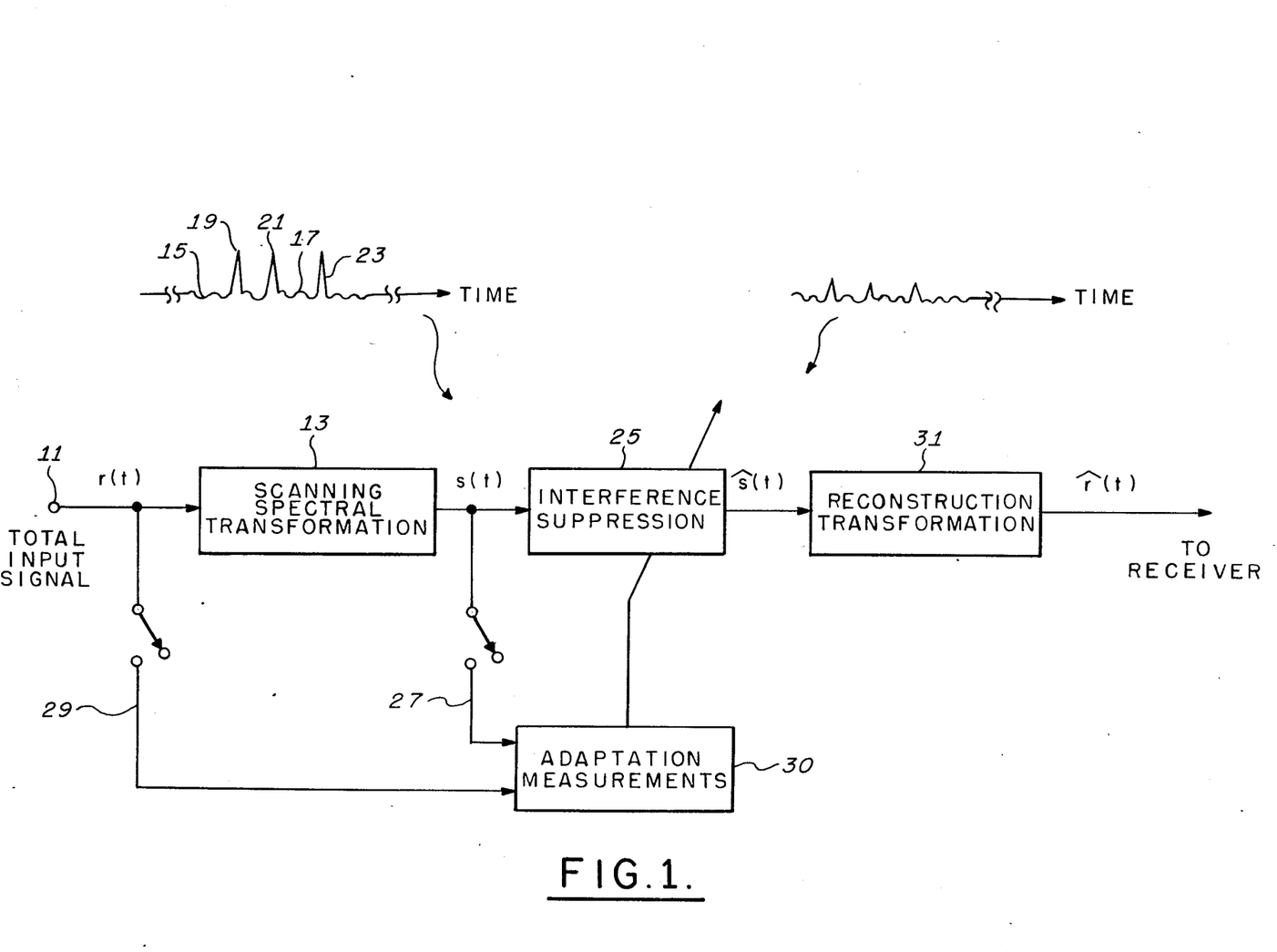
FIG. 1 is a block diagram illustrating the general principles of the invention.

The general principles of the invention can be understood by referring to FIG. 1 wherein an input signal r(t) consisting of a desired broadband signal plus undesired interference components is coupled to an input terminal 11. The input signal is applied to a scanning spectral transformation means 13 which converts the input signal to a signal s(t) which is a spectral or frequency-domain equivalent of the received signal. Typically the signal s(t) may contain desired input signals of relatively uniform amplitude, such as 15 and 17, in which narrowband interfering signals such as those arising from steady sinusoids in the input r(t) appear as impulsive components 19, 21, and 23 in s(t). Thus the strong narrowband interference components in the input r(t) are revealed in s(t) as strong impulsive signals which may be selectively suppressed in an interference suppression means 25. Typically, the suppression means operates by clipping or blanking the interference impulses. The suppression is performed adaptively in response to measurements made on the s(t) signals coupled via line 29 to adaptation measurement means 30. Although either r(t) or s(t) or both may be used as a reference for establishing the clipping level, s(t) is the generally preferred signal for this function.

Following suppression of the narrowband interference components, the modified signal s(t) is applied to reconstruction transformation means 31 wherein an operation inverse to the operation of the scanning spectral transformation means 13 is performed to produce a time-domain signal substantially equal to the received signal with the narrowband interference components significantly reduced. This reconstructed signal can then be applied to a wideband signal receiver.

The narrowband interference suppression system of FIG. 1 is a type of frequency-domain excision system which provides continuous rather than intermittent suppression and reconstruction of the narrowband interference components within the input signal band. Furthermore, except for a delay, the system provides "real time" interference suppression without prior knowledge of the frequencies, phases, or amplitudes of the interferring components.

Figure 2:
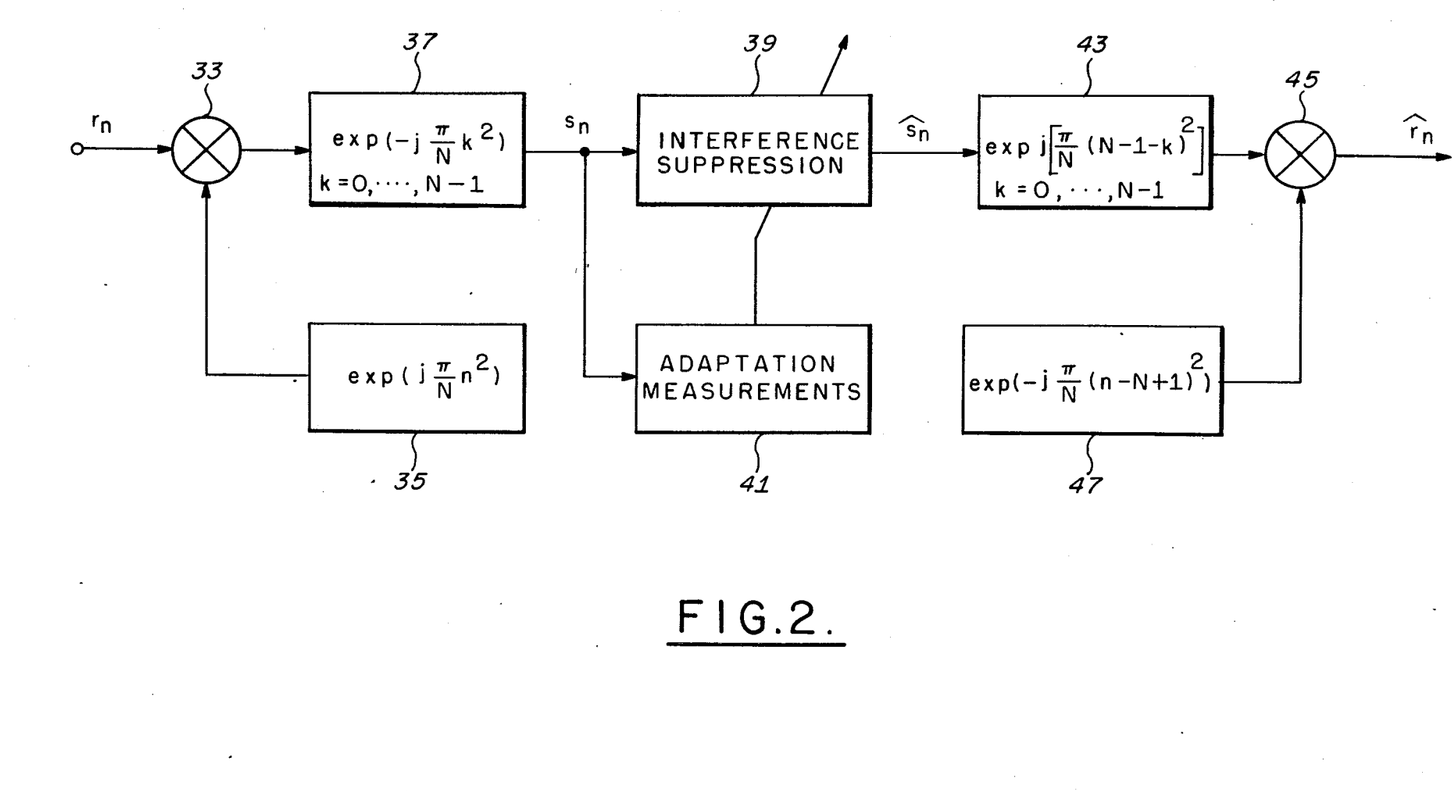
FIG. 2 is a block diagram illustrating a sampled-data embodiment of the invention.

FIG. 2 illustrates a sampled data embodiment of the invention.

For purposes of description the input may be regarded as a continuous sequence of complex-valued signal samples which represent sampled in-phase and quadrature components of the receiver input.

As depicted in FIG. 2, an input signal sample sequence $r_n$ is multiplied in a multiplier 33 on a sample-by-sample basis by a signal generated in a source 35. As indicated in FIG. 2, the source generates a complex-valued sampled signal having a constant magnitude and a phase which progresses quadratically with a time-sample index n. This signal may be represented by $\exp[j\pi n^2/N]$ and has a frequency variation that corresponds to a discrete-time frequency which increases linearly with the time sample index. Thus the input sequence $r_n$ is continuously modulated by a reference signal which periodically sweeps at a linear rate, determined by the parameter N, through the frequency band occupied by the input signal. Effectively, the input band of frequencies is covered once every N samples.

The modulation of the complex-valued input sequence $r_n$ having components $r_{In}$ and $r_{Qn}$, by the complex-valued frequency-swept reference signal generated by the source 35 is carried out by the real-valued signal operations included in:

$$r_n \exp(j\pi n^2/N) = r_{In}\cos(\pi n^2/N) - r_{Qn}\sin(\pi n^2/N) + j[r_{In}\sin(\pi n^2/N) + r_{Qn}\cos(\pi n^2/N)] \quad (1)$$

i.e. four multiplications and a pair of addition/subtraction operations. These operations may be accomplished in a number of straightforward fashions. If the sampled-data signals are digitized, for example, digital multipliers and adders may be used. Similarly, analog multipliers and adders may be used for analog signals. The reference quadratic-phase sinusoids may be obtained by reading samples stored in memory or by generation as needed according to known recursive arithmetic operations.

A convenient means of combining these operations for analog sample multiplication is to retrieve the quadratic phase reference signal that has been stored in a digital memory and to perform the multiplications in a multiplying digital-to-analog converter.

The modulated signal from the multiplier 33 is applied on a continuous basis to an N-point sampled-data linear filter 37 having an impulse response indicated in FIG. 2. It will be noted that the impulse response of the filter 37 is "matched" to the pre-filter modulation, having a quadratic phase that is equal and opposite to that of the modulating signal. The output of the filter 37 is the continuous complex-valued signal sequences $s_n$ composed of the samples:

$$s_n = \sum_{k=0}^{N-1} h_k r_{n-k} \exp\left(j\frac{\pi}{N}(n-k)^2\right) \qquad (2)$$

where the values of $h_k$ represent the impulse response of the filter 37. The complex sampled-data convolution indicated in this equation may be accomplished by employing two pairs of filters with impulse responses $\cos \pi n^2/N$ and $\sin \pi n^2/N$ operating on the real and imaginary inputs of the signal as defined in the foregoing equation 1. These filters have finite-duration impulse responses and for analog-valued samples may include known types of sampled-data filters such as those constructed with charge transfer or switched-capacitor elements. For digitized signal samples, the filter may utilize straightforward combinations of arithmetic, logic, and memory circuits.

Filter 37, together with the multiplier 33 and signal source are equivalent to the scanning spectral transformation means of FIG. 1 and serve to convert the input signal into a signal such as the signal s(t) depicted in FIG. 1.

The operation of this spectral transformation means can be better understood by considering a narrow-band input consisting of a discrete constant frequency signal $r_n = \exp(j2\pi\alpha n)$ where the magnitude of $\alpha$, the frequency offset, is equal to or less than $\frac{1}{2}$ and reveals the location of the tone in the input frequency band after translation to a frequency-domain representation. Multiplication of the input signal in the multiplier 33 by the signal from the source 35 yields a signal which sweeps linearly in frequency versus the time index n with an offset in frequency providing a signal $$\exp\left(j\pi\frac{n^2}{N} + j2\pi\alpha n\right).$$

Since filter 37 is "matched" to this signal, its output will assume a large value according to the time at which the offset frequency is properly phase matched to the filter's impulse response. That time depends on the frequency offset $\alpha$. From the foregoing it can be seen that the response of the filter 37 to the assumed input signal will be:

$$s_n = \frac{\sin\pi(\alpha + n/N)(N-1)}{\sin\pi(\alpha + n/N)(N-1)} \exp\left\{j2\pi\left[\frac{n^2}{2N} + \alpha n - \left(\alpha + \frac{n}{N}\right)\frac{(N-1)}{2}\right]\right\} \qquad (3)$$

The first factor in this equation reveals that $s_n$ becomes impulsive at time-index values $n = -\alpha N + mN$ where $m = \ldots, -1, 0, 1, \ldots$.

Thus it can be seen that a constant frequency input produces a periodic impulsive component as suggested in the waveform depicted in FIG. 1 in which the offset of the times occurrence of the successive impulses is proportional to the frequency offset $\alpha$. This operational characteristic is applicable to all narrowband components in the input signal. Broadband signals are transformed to waveforms which are spread more uniformly in time since such signals have frequency components distributed over the signal band.

Algebraic manipulation of equation 2 yields the exact equivalent:

$$s_n = \exp\left(j\frac{\pi}{N}n^2\right) \sum_{k=0}^{N-1} r_{n-k} \exp(-j2\pi nk/N) \qquad (4)$$

Figure 3:
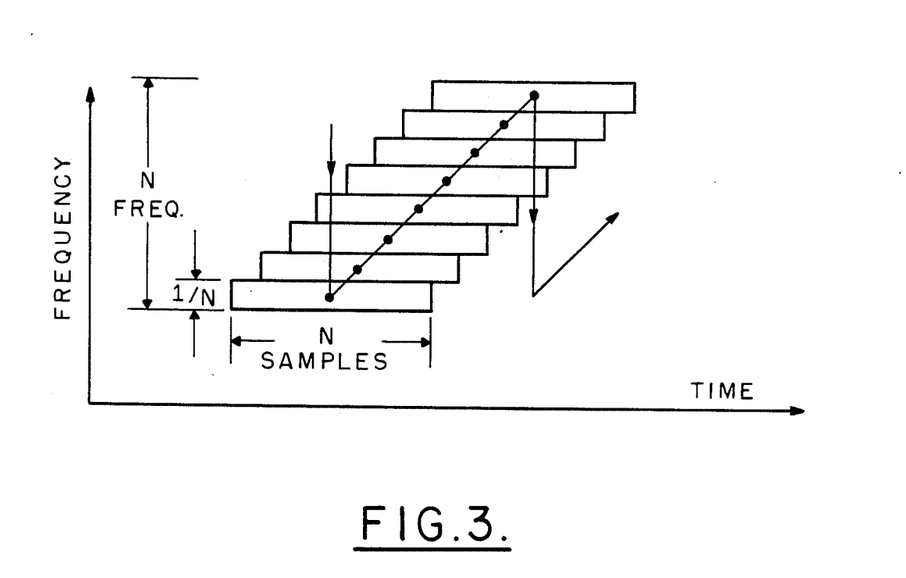
FIG. 3 is a diagram illustrating the time/frequency sampling method employed in the system illustrated in FIG. 2.

From (4) the nth output sample $s_n$ is seen to be the correlation of the past N input samples with a sinusoid of frequency n/N. Successive samples in $s_n$ thus correspond to frequency (spectral) analysis with both the frequency n/N and the time window stepped as shown in FIG. 3, which illustrates the time/frequency coverage of a system in which 8 samples are successively taken (N=8). The entire frequency band illustrated in FIG. 3 is covered every N samples and the procedure is repeated. Since the N-sample window has a (discrete) frequency resolution of 1/N, 100% time/frequency coverage of the input signal is provided by the spectral analysis operation.

Prior art frequency-domain excision systems differ from that of the present invention in that each block of N samples yields N Discrete Fourier Transform coefficients and the time/frequency coverage corresponding to FIG. 3 would be represented by a "stack" of N windows occurring simultaneously.

This time/frequency coverage method of the present invention provides significant advantages over the prior art devices. The conventional chirp-transform of the prior art employs a filter of 2N−1 points. Such a filter necessarily has twice the length (and complexity) of filter 37 of the invention.

Furthermore, the filter of the prior art devices provides a valid output over only part of its output duration. Thus such prior art devices operate with duty factors that are less than 100%. To achieve 100% duty factors in prior art devices, as realized with the device of the present invention, a second filter would have to be added with successive N-sample input signal segments being applied to the two filters in alternating fashion and successive N-sample output signal segments being selected in alterntaing fashion, thereby entailing considerably more complex switching and filtering circuits.

As mentioned previously, the filter 37, together with the modulator 33 and the source 35 comprise the scanning spectral transformation means 13 of FIG. 1 and the output of the filter 37 is typically a waveform as depicted at the output of means 13 in FIG. 1.

The signal $s_n$ from the filter 37 is applied to the interference suppressor 39 which serves to reduce large impulsive components arising from strong narrowband interference components in the signal $r_n$.

The amount of suppression provided by suppression means 39 is adaptively adjusted by measurement means 41, which sets the threshold of the suppression means 39 in response to the signal $s_n$ and possibly also in response to the input signal $\mu_n$.

This suppression of strong narrowband signals in suppression means 39 may be accomplished by various circuits. For example, components in the $s_n$ signal whose magnitudes exceed a predetermined threshold may be set to zero or "blanked". In some instances, it may be preferable to normalize or limit some or all components of the $s_n$ signal to a common magnitude without changing the phase of these components. Either of these methods can be realized using straightforward techniques.

Figure 4:
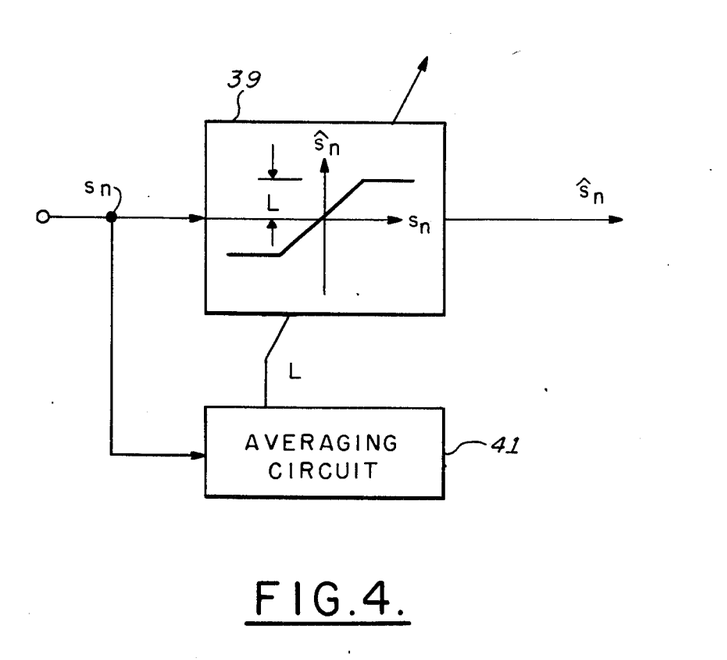
FIG. 4 is a block diagram of a non-linear clipping circuit which may be utilized for the adaptation and interference suppression circuits of FIG. 3.

In the preferred embodiment of the invention, a nonlinear clipping circuit for the interference suppression means 39 as illustrated in FIG. 4 may be utilized. In this device, the adaptation measurement means 41 consists of an averaging circuit which serves to average the amplitudes of the components in $s_n$ to provide a threshold signal L which establishes the clipping level of the suppression means. In the particular circuit of FIG. 4 each complex sample is passed unchanged when its magnitude is less than the threshold L. Components having a magnitude greater than the threshold are reduced to that value. The phase of the components in $s_n$ are unaffected by this circuit. The averaging circuit in the FIG. 4 embodiment is adjusted adaptively so that the samples of $s_n$ corresponding to transformed broadband signal components fall below the threshold but strong impulses are attenuated. Typically, the threshold is set by performing a running average of the magnitude of $s_n$ to establish a broadband background level and selecting a level L that exceeds the measured value by a specified margin.

The suppression of the strong interference components in the signal $s_n$ produces a continuous discrete-time signal $\hat{s}_n$ which is applied to a second filter 43 as shown in FIG. 2. Filter 43 is "matched" relative to filter 37 in that the impulse response of filter 43 is a time-reversed, complex conjugated replica of the impulse response of filter 37, and thus has a duration of N samples and quadratic phase. The output of filter 43 is applied to a second modulator 45 which is in turn, driven by a signal from a second source 47. The second modulating signal source 47 provides a modulating signal of the same form as that provided by the first modulating signal source 35 except that the phase of the signal from source 47 is reversed and the signal is delayed according to the group delay of filters 37 and 43 in cascade.

Filter 43 together with modulator 45 and the modulating signal source 47 transform the spectral domain signal $\hat{s}_n$ and reconstruct a time domain signal $\hat{r}_n$ which is similar to the input signal $r_n$ except that the narrowband interference signals have been substantially reduced. This reconstructed signal may then be applied to a conventional wideband signal receiver.

Filter 43 and the associated modulation circuits may be constructed in the same fashion as the corresponding filer 37 and associated modulating means.

In some applications, it may be desired to employ filters which are not precisely matched to the quadratic phase modulation reference signal. Filter 37 and 43, for instance, may include means to provide amplitude or phase tailoring to improve interference suppression.

Similarly in some applications it may be desirable to insert additional delay between the two modulation operations so that the modulation reference waveforms are identical except for phase sign. In this situation a single reference waveform can be generated for application to both modulators.

Figure 5:
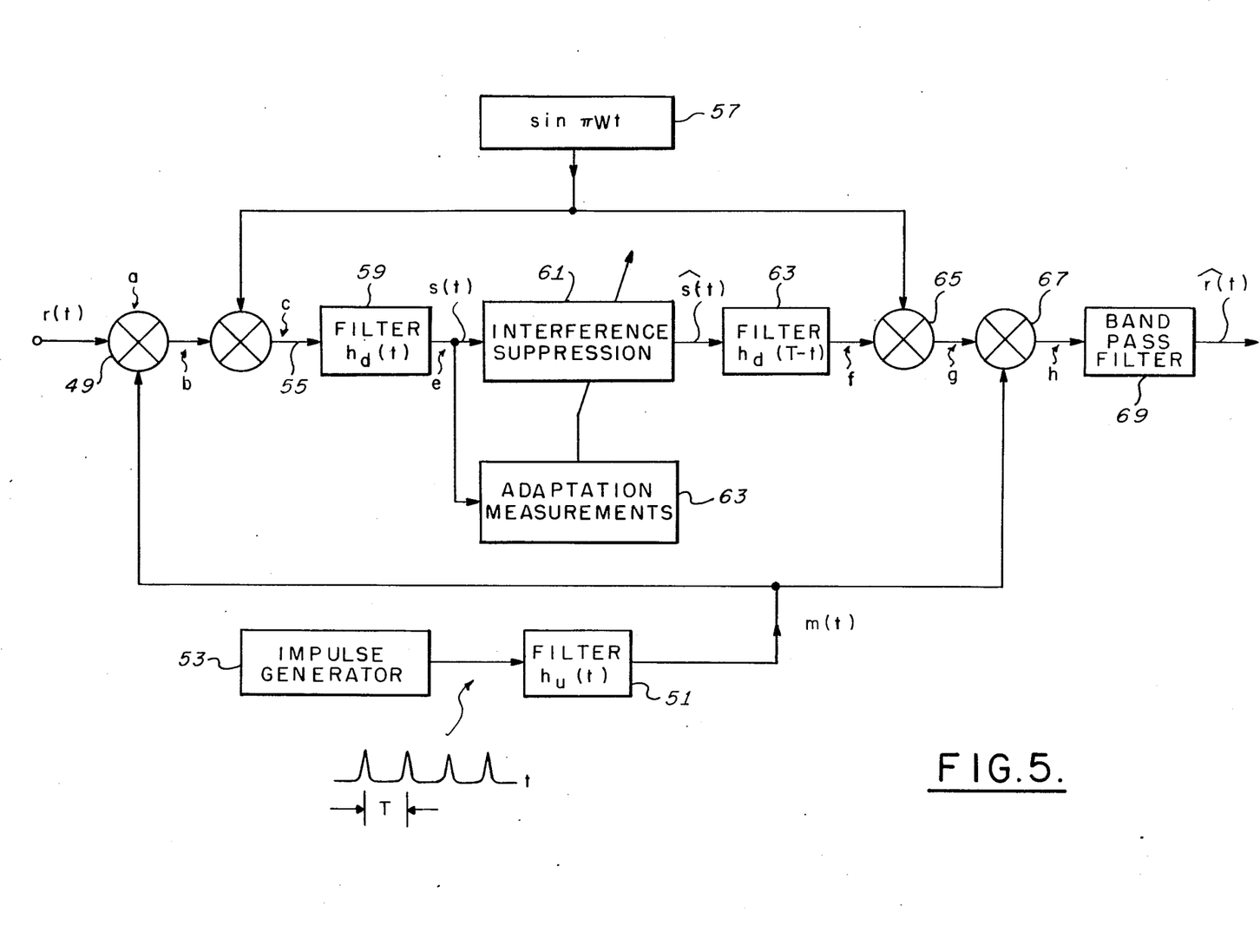
FIG. 5 is a block diagram illustrating an analog embodiment of the invention.

FIG. 5 depicts a particular circuit that may be used to process analog signals, as opposed to the circuit of FIG. 2 which is intended for use with sampled-data signals.

The general principles of operation of the circuit of FIG. 5 are similar to the discrete-time version previously described and to the generalized circuit depicted schematically in FIG. 1.

For purposes of explanation, assume that the circuit of FIG. 5 is intended to process an input signal r(t) having a significant frequency content in the band $f_0 - W'/2$ to $f_0 + W'/2$, wherein the frequency $f_0$ is the carrier frequency of the received signal or a convenient intermediate frequency.

Referring again to FIG. 5, the input signal r(t) is modulated by a signal m(t) in a first modulator 49. The modulating signal m(t) is a periodically repeating bandpass waveform with a phase that progresses quadratically with time. As depicted in FIG. 5, the signal m(t) may be generated by periodically impulsing a filter 51 every T seconds from an impulse source 53. The filter has an impulse response duration equal to one period of the impulse sigal train which may be represented by:

$$h_u(t) = \begin{cases} \sin[2\pi f_1 t + \pi(W/T)(t - T/2)^2], & 0 \leq t \leq T \\ 0, & \text{otherwise} \end{cases} \quad (5)$$

The impulse response (5) is a linear frequency modulated or "chirp" waveform in that its instantaneous frequency sweeps linearly with respect to time throughout a frequency range of $f_1 - W/2$ to $f_1 + W/2$ over a time interval t=0 to t=T, where W is the chirp sweep bandwidth which is wide enough to embrace the input signal bandwidth W'. Thus m(t) is a continuously repeated "upchirp" waveform with a sawtooth frequency versus time characteristic which is repeated with period T. The repetition period T and swept bandwidth W of m(t) over this period are such that the time-bandwidth product TW has an integer value.

It will be recognized that the rectangular envelope of the filter impulse response (5) may not be precisely/achievable and that non-rectangular leading and trailing-edge envelope transients will be present. When m(t) is generated by periodically impulsing such a filter, a filter response envelope characteristic may be employed that results in m(t) having a substantially constant envelope.

Figure 6:
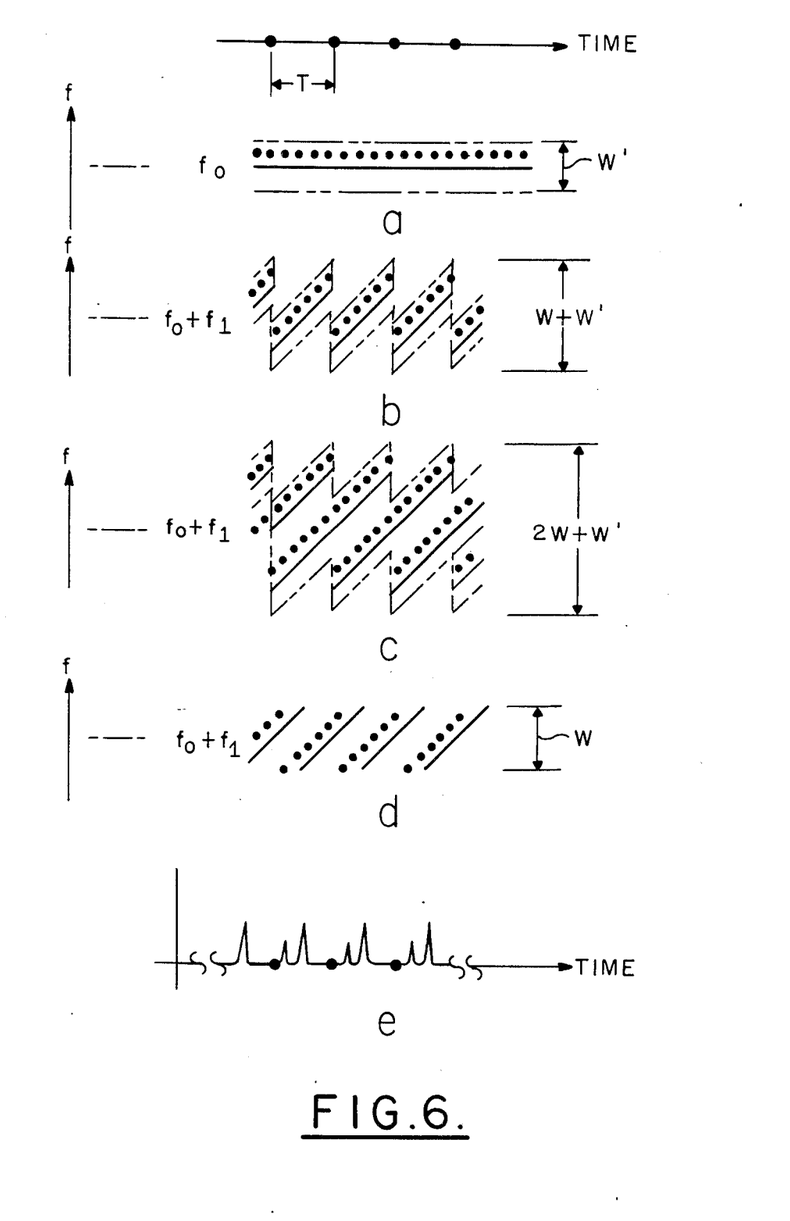
FIGS. 6 and 7 are illustrations of various electrical signals occurring in the circuit of FIG. 5.

The operation of this portion of the circuit of FIG. 5 can be understood by referring to FIGS. 6a and 6b. FIG. 6a illustrates the frequency content of a typical input signal m(t) throughout several periods (T) of the sawtooth-swept waveform m(t). It should be noted that the bandwidth W' of the input signal must be less than the chirp sweep bandwidth W. The particular input signal shown in FIG. 6a contains two CW tones, one at the bandcenter ($f_0$) illustrated as a solid line, and a second CW signal at a higher frequency indicated by a dotted line. The resultant output signal from the mixer 49 is illustrated is FIG. 6b.

Referring again to FIG. 5, the output signal of the chirp modulator 49 illustrated in FIG. 6b is applied to a first double-sideband modulator 55 which also receives a modulating signal from a source 57 of sinusoidal waves having a frequency of W/2 where W is the sweep bandwidth of the chirp signal m(t).

The resultant output signal from the modulator 55 is a double sideband (DSB) replica of the chirp modulated input with sidebands displaced $\pm W/2$ with respect to the intermediate frequency $f_0+f_1$ as illustrated in FIG. 6c.

The phase $\phi$ of the oscillator source 57 is such that the signal output from modulator 55, in response to CW input signals, is comprised of linearly sweeping FM components, the phases of which all progress without discontinuities within the swept bandwidth. Such components are illustrated by the diagonal lines in FIG. 6C.

The signal from the DSB modulator 55 is applied to a downsweep linear FM filter 59 which has an impulse response:

$$h_d(t) = \begin{cases} \sin[2\pi(f_0 + f_1)t - \pi(W/T)(t - T/2)^2], 0 \leq t \leq T \\ 0, \text{otherwise} \end{cases} \quad (6)$$

Filter 59 is thus matched to the frequency-translated chirp modulation and has a frequency passband of width W about $f_0+f_1$. Filter 59 thus responds to the central portion of its input signal indicated in FIG. 6d. For the previously assumed input signal, the filter 59 would provide output pulses corresponding to the two CW received signals as illustrated in FIG. 6e.

Thus, as in the discrete-time embodiment of FIG. 2, the initial modulation operations and filter 59 transform the input signal r(t) into a signal s(t) which has a frequency-domain characteristic. Narrowband signals which do not change frequency more than 1/T Hz over a period T are transformed into impulse components in s(t) occurring at times proportional to frequency as depicted in FIG. 6e. It will be noted that the circuit of FIG. 5 performs this transformation with 100% time-frequency coverage in the manner previously illustrated in FIG. 3 with respect to the sampled data embodiment of FIG. 2.

The output of the filter 59 is applied to an interference suppressor 61 and to an adaptation measurement means 63 in the same manner as the corresponding elements described previously with respect to the sampled data embodiment of FIG. 2. Thus the interference suppression means 61 reduces the amplitude of large impulses in the output signal of the filter 59 that exceed a threshold established by the adaptation measurement means 63.

Figure 7:
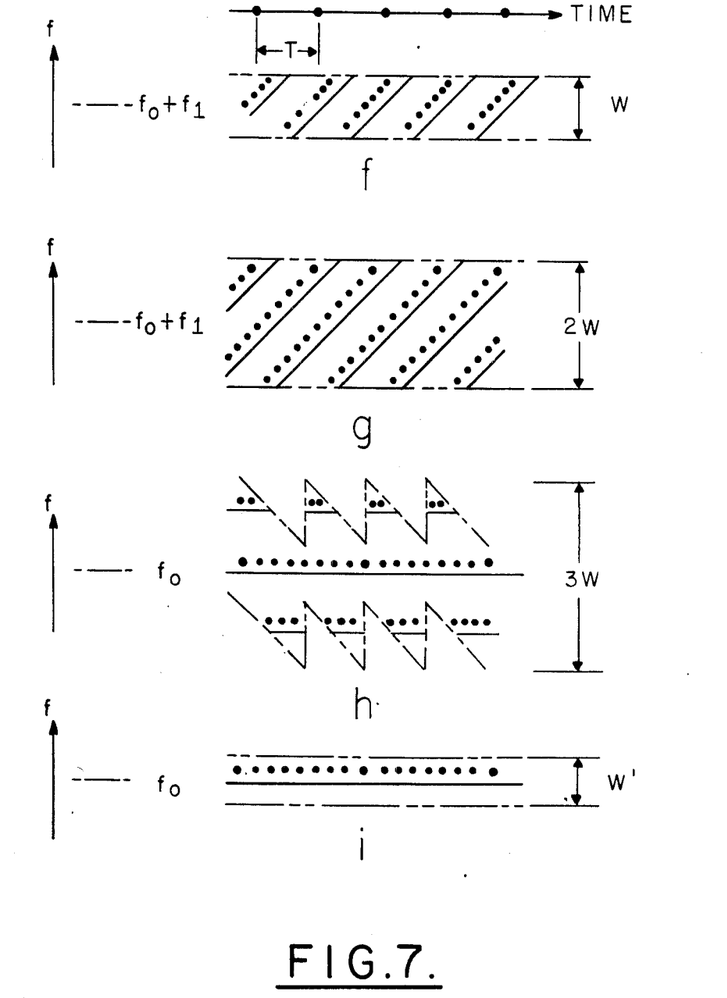

Following reduction of large impulses resulting from strong narrowband interference components in the input signal, the signal $\hat{s}(t)$ is applied to circuitry which provides a continuous time-domain reconstruction of the bandpass input r(t). This is accomplished by applying the $\hat{s}(t)$ signal from the interference suppression means to a filter 63 which is matched to filter 59 in that the impulse response of the filter 63 is a time-reversed version of the impulse response of filter 59. Filter 63 is an up-sweeping chirp device and provides a signal such as that depicted in FIG. 7f in response to the previously assumed input signal r(t) depicted in FIG. 6a.

The $\hat{s}(t)$ signal from the filter 63 is amplitude modulated by the W/2 sinusoidal signal from source 57 in a modulator 65 to produce a DSB waveform depicted in FIG. 7g. This DSB waveform signal is then modulated by the repetitively swept FM reference signal m(t) in a modulator 67 which synchronously matches or "annihilates" the input W Hz chirp modulation and restores the constant frequency-versus-time characteristics for all in-band frequency components, as indicated in FIG. 7h.

The successive modulations by the W/2 Hz sinusoid and m(t) in modulators 65 and 67 operate synchronously with respect to the identical modulation of the input received signal r(t). This synchronism is based on filters 59 and 63 having a composite group delay of 2T seconds over the operating bandwidth and the interference suppression means 61 passing signals without delay. If in practice the overall group delay of the two filters and the interference suppression means exceeds 2T, then the necessary synchronism of the modulation may be achieved by appropriate delay of m(t) entering modulator 67 and corresponding phase shift of the W/2 Hz sinusoid entering modulator 65.

The output signal from modulator 67 is applied to a bandpass filter 69 which passes the original frequency band and rejects the unwanted sideband signals as shown in FIG. 7i. The resulting signal r(t) can then be applied to a conventional broadband receiver. It should be noted that the bandpass filter 69 can be eliminated if the receiver to be used has sufficiently selective input filtering.

It will be appreciated that modifications of the circuit depicted in FIG. 5 may be made if desired. For example, the periodically repeated chirp modulation achieved by periodically impulsing a filter having an up-chirp response may be replaced by other straightforward circuits for achieving the same m(t) signal.

Similarly the order of the two input or the two output modulations may be reversed if so desired. Furthermore, it may be desired to replace the m(t) and DSB modulations with a single modulating signal composed of a sum of two up-chirps characterized in that one up-chirp sweeps periodically with a period of 2T from $f_1-W$ to $f_1+W$ and in that the other up-chirp is identical to the first, but delayed by T seconds.

Although FIG. 5 shows a particular set of up-sweep and down-sweep chirp filtering and modulation operations, it will be recognized that the interference suppression system operates if the direction of chirp sweep is reversed for all operations. Furthermore, other alternative configurations are possible by use of different intermediate frequencies within the system. For example, instead of the down-chirp filter 59 at the sum frequency $f_0+f_1$, equivalent operation is achieved by using an up-sweep filter at the difference frequency $f_0-f_1$ ($f_0>f_1$), followed by suitably matched reconstruction processing. It is also possible to invert the slope of chirp reference signals by up-or-down conversion modulation and difference or sum frequency modulation product selection. By employing various combinations of these well-known methods, the interference suppression system may be constructed with chirp filtering devices all having the same slope, or having identical slope and center frequency.

As was the case with respect to the discrete-time embodiment of the present invention, the analog embodiments differ fundamentally from prior art circuits. Prior art circuits employ a filter having an impulse duration response of 2T and a bandwidth of 2W. This requires a filter time-bandwidth product of 4TW and provides only a 50% duty factor. Full time/frequency coverage could be accomplished with a pair of multiplexed chirp filters operating in "ping-pong" fashion, but the resulting circuit complexity would make such circuits unwieldy.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. A narrowband interference suppression system for use with a broadband radio receiver comprising:
    means for converting received time-domain signals to frequency-drain representations thereof:
    means for suppressing pulses in the frequency domain representations having magnitudes that exceed a threshold level thereby providing suppressed frequency-domain signals;
    means for determining a running average of received time domain signal amplitudes and for continuously adjusting the threshold level in accordance therewith;
    reconstruction transformation means for reconverting the suppressed frequency domain signals to coherent continuous time-domain output signals; and
    means for applying the time-domain output signals to an external receiver.

2. The interference suppression system of claim 1 wherein the pulse suppression means comprises a nonlinear clipping circuit.

3. The interference suppression system of claim 1 wherein the means for converting received time-domain signals to frequency-domain representations of those signals includes:
    a first source of modulating signals constructed to generate constant magnitude complex valued signals with a quadratically progressing phase that provides a periodic frequency variation at a linear rate through the frequency band occupied by the input signals;
    means for modulating received time-domain signals by the complex-valued signals from the modulating source; and
    a first filter coupled to receive the modulated signals and having a complex impulse response that is the complex conjugate of the complex value of the modulating signals.

4. The interference suppression system of claim 3 wherein the modulating means produces a signal having a sequence $\exp(j(\pi/N)n^2)$ where n is a time sample index and N is the number of samples derived throughout a sweep period, and wherein the first filter is an N-point sampled data linear filter having an impulse response $\exp(-j(\pi/N)k^2)$ where k represents the samples for $k=0$ to $k=N-1$ in each sweep period.

5. The interference suppression system of claim 4 further characterized in that the reconstruction transformation means includes a second filter coupled to respond to the signals from the pulse suppression means, and in that the reconstruction transformation means further includes a second source of modulating signals and modulating means coupled to modulate the signals from the second filter by the signals from the second source, the second source and second filter being constructed and arranged to respectively produce a signal having a sequence $\exp[-j(\pi/N)(n-N+1)^2]$ and an impulse response $\exp[j(\pi/N)(N-1-k)^2]$.

6. The interference suppression system of claim 3 wherein the reconstruction transformation means includes a second filter having an impulse response which is a time-reversed complex-conjugated replica of the impulse response of the first linear filter.

7. The interference suppression system of claim 6 further characterized in that the second filter is coupled to respond to the signals from the pulse suppression means, and in that the reconstruction transformation means further includes a second source of modulating signals and modulating means coupled to modulate the signals from the second filter by the signals from the second source, the second source being constructed and arranged to produce a delayed, phase-reversed modulating signal of the same form as that produced by the first source of modulating signals.

8. The interference suppression system of claim 1 wherein the means for converting the received time-domain signal to a frequency-domain representation thereof includes:
    means for providing a continuously repeated chirp waveform;
    means for modulating the received signal by the chirp waveform to obtain a chirp-modulated signal;
    means for modulating the chirp-modulated signal by a sinusoidal wave having a frequency equal to one-half the chirp sweep bandwidth; and
    a linear FM filter matched to the chirp-modulated signal and coupled to the sinusoidal modulating means to provide the frequency domain signal representative of the received time-domain signal.

9. The interference suppression system of claim 8 wherein the reconstruction transformation means includes a chirp filter with an impulse response that is a time-reversed version of the impulse response of the linear FM filter coupled to receive the suppressed frequency-domain signal; and
    means coupled to the chirp filter, the chirp waveform means, and to receive the sinusoidal wave for modulating output signals of the chirp filter by the chirp and sinusoidal waveforms.

10. A narrowband interference suppression system for use with a broadband radio receiver comprising:
    means for converting received time-domain signals to frequency-domain representations thereof;
    means for suppressing pulses in the frequency domain representations having magnitudes that exceed a threshold level, thereby providing suppressed frequency domain signals;
    means for determining a running average of the frequency-domain signals representative of the received time-domain signals and for continuously adjusting the threshold level in accordance therewith;
    reconstruction transformation means for reconverting the suppressed frequency-domain signals to coherent continuous time domain output signals; and
    means for applying the time domain output signals to an external receiver.

11. The interference suppression system of claim 10 wherein the pulse suppression means comprises a nonlinear clipping circuit.

12. The interference suppression system of claim 10 wherein the means for converting received time-domain signals to frequency-domain representations of those signals includes:
- a first source of modulating signals constructed to generate constant magnitude complex valued signals with a quadratically progressing phase that provides a periodic frequency variation at a linear rate through the frequency band occupied by the input signals,
- means for modulating received time-domain signals by the complex valued signals from the modulating source; and
- a first linear filter coupled to receive the modulated signals and having a complex impulse response that is the complex conjugate of the complex value of the modulating signals.

13. The interference suppression system of claim 12 wherein the modulating means produces a signal having a sequence $\exp(j\pi n^2/N)$ where n is a time sample index and N is the number of samples derived throughout a sweep period, and wherein the first filter is an N-point sampled data linear filter having an impulse response $\exp(-j\pi k^2/N)$ where k represents the samples for $k=0$ to $k=N-1$ in each sweep period.

14. The interference suppression system of claim 13 further characterized in that the reconstruction transformation means includes a second filter coupled to respond to the signals from the pulse suppression means, and in that the reconstruction transformation means further includes a second source of modulating signals and modulating means coupled to modulate the signals from the second filter by the signals from the second source, the second source and second filter being constructed and arranged to respectively produce a signal having a sequence $\exp[-j(\pi/N)(n-N+1)^2]$ and an impulse response $\exp[j(\pi/N)(N-1-k)^2]$.

15. The interference suppression system of claim 12 wherein the reconstruction transformation means includes a second filter having an impulse response which is a time-reversed complex-conjugated replica of the impulse response of the first linear filter.

16. The interference suppression system of claim 15 further characterized in that the second filter is coupled to respond to the signals from the pulse suppression means, and in that the reconstruction transformation means further includes a second source of modulating signals and modulating means coupled to modulate the signals from the second filter by the signals from the second source, the second source being constructed and arranged to produce a delayed, phase reversed modulating signal of the same form as that produced by the first source of modulating signals.

17. The interference suppression system of claim 10 wherein the means for converting the received time-domain signals to frequency-domain representations thereof includes:
- means for providing a continuously repeated chirp waveform;
- means for modulating the received signals by the chirp waveform to obtain chirp-modulated signals;
- means for modulating the chirp-modulated signals by a sinusoidal wave having a frequency equal to one-half the chirp-sweep bandwidth; and
- a linear FM filter matched to the chirp-modulated signals and coupled to the sinusoidal modulating means to provide frequency-domain signals representative of the received time-domain signals.

18. The interference suppression system of claim 16 wherein the reconstruction transformation means includes a chirp filter with an impulse response that is a time-reversed version of the impulse response of the linear FM filter coupled to receive the suppressed frequency-domain signals; and
- means coupled to the chirp filter, the chirp waveform means, and to receive the sinusoidal wave for modulating output signals of the chirp filter by the chirp and sinusoidal waveforms.

* * * * *